April 16, 1968

D. ALTMAN 3,377,801

LIQUID PROPULSION SYSTEM AND METHOD WITH FUELS
AND OXIDIZER IN THERMAL CONTACT

Filed Nov. 18, 1964

INVENTOR.
DAVID ALTMAN
BY Jack L. Dohan
Attorney

INVENTOR.
DAVID ALTMAN

United States Patent Office 3,377,801
Patented Apr. 16, 1968

3,377,801
LIQUID PROPULSION SYSTEM AND METHOD WITH FUELS AND OXIDIZER IN THERMAL CONTACT
David Altman, Menlo Park, Calif., assignor to United Aircraft Corporation, East Hartford, Conn., a corporation of Delaware
Filed Nov. 18, 1964, Ser. No. 412,094
14 Claims. (Cl. 60—206)

The present invention relates to a liquid propulsion system and more particularly to a bi-propellant, liquid-propulsion system wherein the liquid fuel and liquid oxidizer have certain physical characteristics in common.

At the present time, a wide variety of bi-propellant liquid propulsion systems are employed for various missions in space. However, a new problem which presents itself to the design engineer for space missions is to provide for adequate storability of propellants when the propulsion system must remain in space for prolonged periods of time extending, in some cases, into many months or years. A fundamental major source of propellant loss results from the energy interchange between the two propellant tanks of the system. For example, tanks containing propellants of widely varying boiling points must be insulated from one another, otherwise, the heat absorption by the lower boiling point propellant results in its volatilization and excessive propellant escapes through feed lines and pressure relief valves. Such insulation of the tanks results in unnecessary bulk and weight which reduces the payload of the system.

The present invention, however, avoids the aforementioned difficulties by employing a bi-propellant system wherein a liquid fuel and liquid oxidizer are selectively adjusted in physical properties such as boiling point, freezing point and temperature coefficient of vapor pressure whereby the propellants react so similarly to environmental change that a common storage tank with only a thin-walled bulkhead sepaarting the two propellants may be used. This simplified, compact design of the propellant tanks results in a lower hardware weight and therefore more efficient propulsion system.

It is an object, therefore, of the present invention to provide high-performance, bi-propellant rocket systems using liquid oxidizers and liquid fuels which possess certain common physical properties which will substantially eliminate propellant losses during long-resident-time space missions.

It is yet another object of the present invention to provide a tankage system for a bi-propellant engine which will be substantially isothermic and isobaric.

It is another object of the present invention to provide a propulsion system for space missions having a light weight, efficient and compact tankage system with a thin, common bulkhead between the fuel and oxidizer tanks.

These together with the various ancillary objects and features of the invention will become more readily apparent upon consideration of the teachings as hereinbelow set forth in detail and illustrated in the accompanying drawings wherein.

Figure 1:
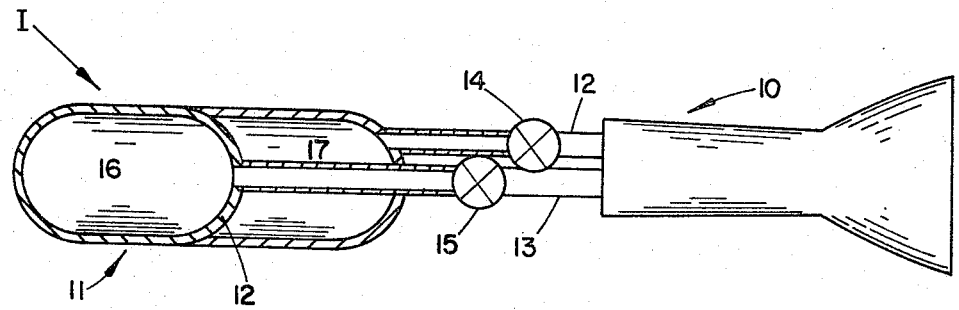
FIG. 1 shows a cross-sectional view of a bi-propellant rocket motor using the propellant and tankage system of the present invention.

A serious problem confronting future, long-resident-time, space missions employing bi-propellant reaction engines revolves about the difficulties encountered because of the energy differentials in the propellant systems which result in an energy interchange between the propellant tankage systems and associated fluid feed lines. For example, when an oxidizer such as oxygen difluoride with a boiling point of −229° F. and a fuel such as hydrazine having a boiling point of +235° F. are employed in a thrust generator, the oxygen difluoride must be maintained at a lower temperature, making it a heat or energy sink to the balance of the propulsion system, while, on the other hand, the hydrazine tankage and feed line systems will be at a substantially higher temperature acting as an energy source with respect to the oxygen difluoride system. Consequently, there will be a continual radiation and conductive energy interchange between the two tankage and feed systems. As a result, the vapor pressure of the oxygen difluoride will tend to be substantially higher than that of the hydrazine, thereby requiring tankage systems of different design parameters in order to accommodate the pressure differentials involved.

The present invention, however, provides a method for obviating the aforementioned difficulties in propulsion systems for space missions. It has been discovered, for example, that an unusually compatible bi-propellant system is comprised of oxygen difluoride as the oxidizer and a mixture of 25 percent by weight of methane with 75 percent of ethane as a fuel. This fuel mixture, aside from exhibiting unusually high performance with oxygen difluoride, has a boiling point which is substantially identical to that of the oxygen difluoride. Moreover, it possesses a temperature coefficient of vapor pressure which is substantially identical to that of oxygen difluoride. The common boiling point results in substantially common liquid ranges between the propellants thereby permitting their being maintained at the same temperature and greatly reducing the need for tank and line insulation to avoid propellant losses. In addition, the similar temperature coefficient of vapor pressure assures substantially constant pressure conditions in the two liquid systems even though there are temperature increases or decreases in the two liquids. Consequently, the two liquids exhibit substantially no pressure differential even though the absolute pressures increase or decrease in the two liquids because of heating or cooling. As a result, as long as the entire system is subjected to substantially the same environmental conditions, the vapor pressures of the two liquids will be substantially identical. Even if the two propellants are subject to varying radiation conditions while in space, the temperature and pressure differences will be small since an energy transfer will occur between the systems allowing equalization. Although there will be a slight energy hysteresis, by placing the propellants in substantial thermal contact, the energy transfer will take place at a rapid rate.

A specific preferred design configuration is shown in FIG. 1 where 10 is a conventional bi-propellant liquid engine with the usual associated feed lines 12 and 13 and control valves 14 and 15, but the propellants contained in tank 11 are separated only by thin-walled bulkhead 12. Assuming radiation I impinges upon fuel compartment 16, the fuel temperature will be raised and the pressure therein increased. If the pressure becomes substantially different from that in oxidizer chamber 17, bulkhead 12 would rupture, terminating the mission. However, because the fuel and oxidizer are separated by the bulkhead 12, the temperature in the two compartments tend to equalize very quickly resulting in no untoward pressure differential between the two compartments 16 and 17.

Figure 2:
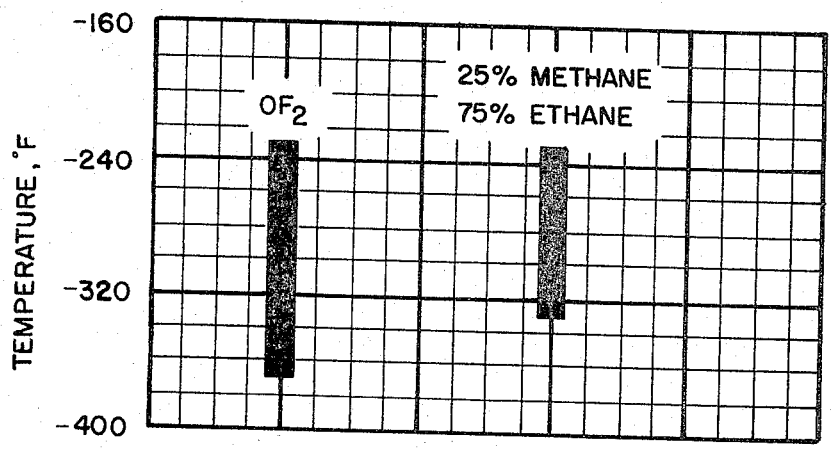
FIG. 2 illustrates diagrammatically the overlap of liquid ranges of a preferred propellant system of the present invention.

By selecting materials with appropriate radiation reflection and absorption coefficients for the outside surfaces of the motor system of FIG. 1, temperature conditions can be readily maintained in the range from −320° F. to −240° F. well within the liquid range of both propellants as shown in FIG. 2. As long as the propellants are maintained in this range of temperatures, the vapor pressure of the propellants will be less than one atmosphere and the vapor pressure differential between compartments 16 and 17 of FIG. 1 will not exceed several pounds per square inch necessitating, therefore, only a very thin bulkhead 12 between the compartments to prevent rupture.

Figure 3:
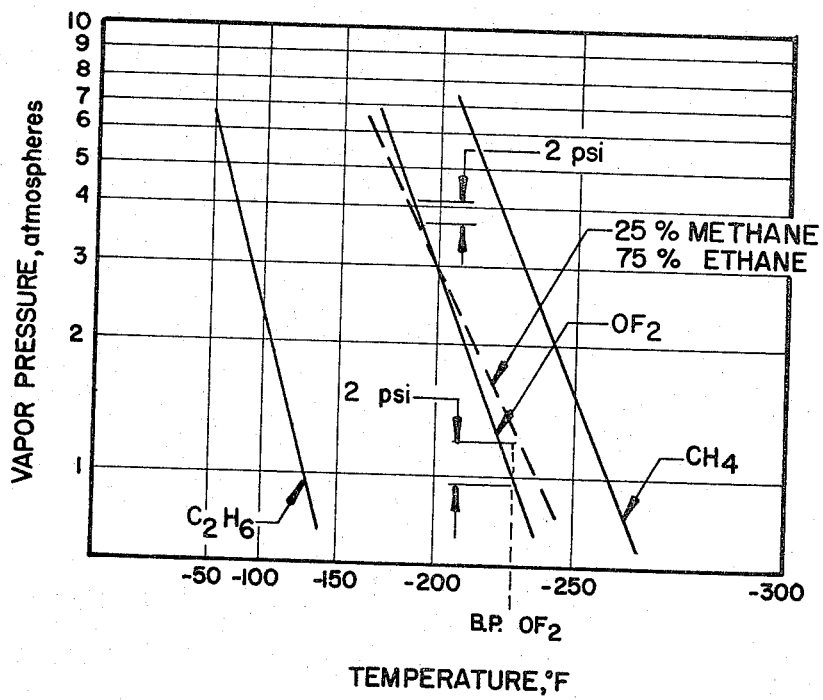
FIG. 3 shows graphically the thermal coefficient of the vapor pressure of several propellants.

Even if higher temperatures were reached, the pressure differential between compartments 16 and 17 would not reach significant proportions, as shown in FIG. 3. The thermal coefficient of the vapor pressure for the 25–75 methane-ethane fuel mixture so approximates that of $OF_2$ that only very low pressure differentials occur, and at approximately −200° F. no pressure differential would exist.

In the specific example above, it has been found that the methane can be allowed to range from approximately 20 to 30 percent by weight and the ethane may range from about 70 to 80 percent by weight in the fuel mixture without significant alteration in common temperature ranges or adversely effecting the thermal coefficient of vapor pressure. Additional variations on this mixture can be made by adding small percentages of additives for various purposes such as rendering the fuel hypergolic with $OF_2$. Quantities up to 10 to 15 percent of such fuels as boron trimethyl, diazomethane, aluminum alkyls, beryllium alkyls and others can be added to the mixture of ethane and methane without materially affecting the overlap of liquid ranges or coefficient of vapor pressure. The quantity of additive will cause a change in the quantities of both constituents approximately in the same proportion. For example, 10 percent of an additive may cause a variation of as much as 10 percent in the basic methane content and, likewise, as much as 10 percent in the ethane content.

Figure 4:
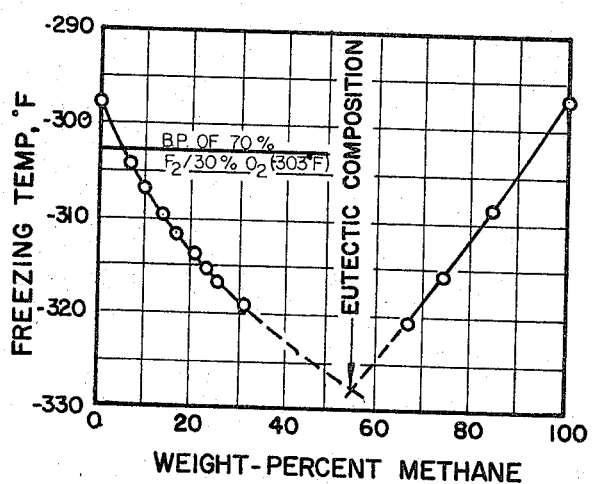
FIG. 4 is a phase diagram showing the lower limit for the liquid ranges for all binary compositions of methane and ethane.

Although $OF_2$ has been described above as a preferred example of oxidizer, the present invention also provides benefits for other oxidizers and mixtures of oxidizers. For example, the combination of elemental oxygen and elemental fluorine as a physical mixture results in an exceptionally high-performance, liquid oxidizer. For example, a seventy-thirty (70/30) mixture by weight of fluorine and oxygen provides an oxidizer of high performance capability with hydrocarbons. A freezing point phase diagram of a methane-ethane fuel system is shown in FIG. 4 with the boiling point isotherm of the oxidizer mixture superimposed thereon. The unexpected occurance of a eutectic phase in the ethane-methane mixture is the subject of co-pending application Ser. No. 412,209 filed on Nov. 18, 1964 and as can be seen from FIG. 4, at the eutectic mixture corresponding to 55 weight percent of methane in ethane, there is a common liquid range at one atmosphere between −327° F. and −303° F. This 24° F. common-liquid range is sufficiently broad to permit substantial thermal exchange between the propellants without fear of freezing the fuel mixture. In this case, a broad common-liquid range is realized by adjusting the freezing point of the fuel mixture as opposed to the adjusting of the boiling point in the case of the 25 methane-75 ethane example first discussed.

It is evident, therefore, that the present invention provides a system for placing the liquid propellant of a long-space-resident time motor in thermal contact without endangering the mission or vehicle occupants. Accordingly, the usual precautionary measure of thermally insulating the propellant systems from each other will not be required and the reliability of the system, as a result, is substantially improved.

From the aforementioned examples, it is clear that various bi-propellant liquid propulsion systems may be designed employing a wide variety of oxidizers and fuels. In some instances, a single component fuel may be used whereas the oxidizer will be an admixture of two or more components selectively adjusted to produce boiling point and temperature coefficients common to the fuel. Likewise, it is possible to provide both an oxidizer and a fuel, each of which is an admixture of several basic components, in order to selectively adjust the aforementioned physical properties whereby they may be safely placed in thermal contact in the vehicle.

It will be understood that the aforementioned specific embodiments of the invention herein disclosed are of a descriptive rather than a limiting nature and that various changes, combinations, substitutions or modifications may be employed in accordance with these teachings without departing either in spirit or scope from this invention in its broader aspects.

I claim:

1. A method for generating high-temperature gases for thrust and gas generators comprising injecting oxygen difluoride in a reaction chamber and reacting said $OF_2$ with a separately injected liquid propellant fuel consisting essentially of 85% to 100% by weight of a hydrocarbon mixture and from 0% to 15% by weight of a high energy additive, said hydrocarbon mixture consisting essentially of from 20 to 30 percent by weight of methane and from 70 to 80 percent by weight of ethane.

2. In a long resident time, bipropellant space vehicle comprised of a thrust chamber, means for storing a first liquid propellant and a second liquid propellant and means for selectively injecting said first and second liquid propellant into said thrust chamber, the improvement wherein said first liquid propellant consists of $OF_2$, said second liquid propellant consists of from 85% to 100% by weight of a hydrocarbon mixture and from 0% to 15% of a compatible high energy additive, said hydrocarbon mixture consisting of from 20% to 30% by weight of methane and from 70% to 80% by weight of ethane and said means for storing said first and second liquid propellants comprises first and second separate chambers for containing said first and second liquid propellants, respectively, which chambers are in physical contact so that said first and second liquid propellants contained therein are in substantial thermal conductive relationship.

3. A space vehicle as in claim 2 wherein the two separate chambers are separated by a thin-walled bulkhead of material having high thermal conductivity.

4. A space vehicle as in claim 3 wherein said second liquid propellant consists solely of from 20 to 30 percent by weight of methane and from 70 to 80 percent by weight of ethane.

5. The space vehicle of claim 2 wherein said high energy additive renders said first and second liquid propellants hypergolic.

6. The space vehicle of claim 2 wherein said high energy additive is selected from the group consisting of boron trimethyl, diazomethane, aluminum alkyls, beryllium alkyls.

7. The space vehicle of claim 2 wherein said second liquid propellant consists essentially of said hydrocarbon mixture.

8. A method of mitigating propellant losses in space vehicles employing cryogenic propellants which comprises providing a liquid oxidizer consisting essentially of $OF_2$ and a liquid fuel consisting essentially of from 85% to 100% by weight of a hydrocarbon mixture and from 0% to 15% of a high energy additive said hydrocarbon mixture consisting of from 20% to 30% by weight of methane and from 70% to 80% by weight of ethane, and storing said liquid fuel and liquid oxidizer physically separated and in substantial thermal conductive relationship.

9. The method of claim 8 wherein said high energy additive renders said first and second liquid propellants hypergolic.

10. The method of claim 8 wherein said additive is selected from the group consisting of boron trimethyl, diazomethane, aluminum alkyls and beryllium alkyls.

11. The method of claim 8 wherein said liquid fuel consists essentially of said hydrocarbon mixture.

12. The vehicle of claim 1 wherein said hydrocarbon mixture consists of 25% by weight methane and 75% by weight ethane.

13. The method of claim 8 wherein said hydrocarbon mixture consists of 25% by weight methane and 75% by weight ethane.

14. A method for mitigating propellant losses in a long resident time, bipropellant space vehicle comprising providing a liquid fuel consisting essentially of hydrocarbon mixture of from 20% to 30% by weight of methane and from 70% to 80% by weight of ethane, providing a liquid oxidizer consisting essentially of $OF_2$ and placing said liquid fuel and liquid oxidizer in substantial thermal conductive relationship.

References Cited
UNITED STATES PATENTS

| | | | |
|---|---|---|---|
| 2,829,491 | 4/1958 | Teague | 60—259 |
| 2,850,975 | 9/1958 | Teague | 60—259 X |
| 2,968,145 | 1/1961 | Kanarek | 149—1 X |
| 2,972,225 | 2/1961 | Cummings et al. | 60—259 X |
| 3,013,389 | 12/1961 | Barnes | 60—259 X |
| 3,091,081 | 5/1963 | Alger et al. | 60—259 |

OTHER REFERENCES

Huff et al.: National Advisory Comm. for Aeronautics, Research Memorandum E56K14 (1957), pp. 1–10.

Hendel: Chemical Engineering, Apr. 3, 1961, pp. 131–133.

Sloop: Astronautics, September 1958, pp. 28, 29, 30, 96 and 97.

BENJAMIN R. PADGETT, *Primary Examiner.*

L. DEWAYNE RUTLEDGE, *Examiner.*